United States Patent
Mellon

[11] Patent Number: 6,164,521
[45] Date of Patent: Dec. 26, 2000

[54] METHOD OF FABRICATING GENERATOR MAIN LEAD BUSHINGS

[75] Inventor: Greyson L. Andy Mellon, Casselberry, Fla.

[73] Assignee: Siemens Westinghouse Power Corporation, Orlando, Fla.

[21] Appl. No.: 09/274,444

[22] Filed: Mar. 22, 1999

[51] Int. Cl.⁷ .................................................. B21D 39/04
[52] U.S. Cl. ...................... 228/164; 228/123.1; 228/174; 228/165; 228/255
[58] Field of Search ................................ 228/175, 233.2, 228/245, 251, 249, 255, 141.1, 164, 165, 174, 122.1, 123.1, 123; 219/56, 636, 605, 615, 635, 174

[56] References Cited

U.S. PATENT DOCUMENTS

| | | |
|---|---|---|
| 235,834 | 12/1880 | White . |
| 2,033,122 | 3/1936 | Cornell . |
| 3,419,953 | 1/1969 | Deimen . |
| 3,667,109 | 6/1972 | Alcenius . |
| 3,838,497 | 10/1974 | Rizzitano et al. . |
| 4,174,563 | 11/1979 | Simpson ................................. 29/628 |
| 4,195,764 | 4/1980 | Bogart ..................................... 228/208 |
| 4,285,459 | 8/1981 | Baladjanian et al. ................... 228/119 |
| 4,326,117 | 4/1982 | Kanne, Jr. et al. ....................... 219/85 |
| 4,523,117 | 6/1985 | Daniels . |
| 4,844,322 | 7/1989 | Flowers et al. ......................... 228/119 |
| 4,862,581 | 9/1989 | Royer . |
| 4,866,748 | 9/1989 | Caraher et al. . |
| 4,952,831 | 8/1990 | Isozumi et al. . |
| 5,042,847 | 8/1991 | Lasecki et al. ........................... 285/138 |
| 5,182,848 | 2/1993 | Wheeler . |
| 5,267,684 | 12/1993 | Catheline et al. . |
| 5,333,918 | 8/1994 | Crout et al. .............................. 285/286 |
| 5,382,856 | 1/1995 | Keck et al. . |
| 5,437,092 | 8/1995 | Hartman et al. .......................... 29/600 |
| 5,950,906 | 8/1999 | Pierce et al. ............................ 228/175 |

FOREIGN PATENT DOCUMENTS

| | | |
|---|---|---|
| 59-141366 | 8/1984 | Japan . |
| 10-235468 | 9/1998 | Japan . |
| 11-033712 | 2/1999 | Japan . |

OTHER PUBLICATIONS

Nippes. Metals Handbook Ninth Edition: vol. 6, 1983. pp. 60–66.

Olson. ASM Handbook: vol. 6, 1993. pp. 931–933.

*Primary Examiner*—Patrick Ryan
*Assistant Examiner*—Jonathan Johnson
*Attorney, Agent, or Firm*—Eckert Seamans Cherin & Mellot, LLC

[57] ABSTRACT

A method of fabricating an electric generator main lead bushing is provided for attaching a flange to a hollow conductor. In one application typically used for an air side flange, a gap is formed in the flange that is sized to receive an end of the conductor, a groove is formed in the conductor end, a braze alloy insert is placed into the groove, the conductor end is inserted into the gap, and the flange and the conductor are heated and cooled to provide a seal between the flange and the conductor. In another application typically used for a gas side flange, a counterbore is formed in an inner portion of the hollow conductor that is sized to receive the flange, a groove is formed in the counterbore, a braze alloy insert is placed into the groove, the flange is fitted into the counterbore, and the flange and the conductor are heated and cooled to provide a seal between the flange and the conductor.

22 Claims, 2 Drawing Sheets

METHOD OF FABRICATING GENERATOR MAIN LEAD BUSHINGS

FIELD OF THE INVENTION

This invention relates generally to the field of electrical generators, and more specifically to a method of applying pre-placed and manually fed braze alloy into joints of main lead bushings for high power electric generators.

BACKGROUND OF THE INVENTION

The main lead bushings of an electrical generator function both as a conductor for the generated electrical energy and as a seal for the cooling gas within the generator. The typical design of a main lead bushing includes a cylindrical hollow copper conductor with cylindrical flanges attached to it. An air side flange is attached to the end of the segment of the hollow conductor that extends outside of the generator. A gas side flange is attached to the end of the segment that extends inside the generator and connects to the lead box.

The seal between the hollow conductor and the flanges is of critical importance, both for mechanical and electrical reasons. The main lead bushings are subject to vibrational loads during operation, and gaps in the seal create stress risers that may result in flange detachment and generator failure. Also, electrical current flows primarily along the outer surface of the conductor and outward along the surface of the flange. Accordingly, gaps or holes in the seal, especially near the outer surface of the conductor, may lead to flux concentrations and locally intensified heating, which also may result in generator failure.

FIG. 1 depicts a conductor 1 attached to a flange 2 in accordance with the prior art. In order to attach the flange 2 to the hollow conductor 1, a circular gap 3 sized to receive the end 4 of the conductor 1 is formed in the base of the flange. Threads 5, 6 are formed in both the outside surface of the end 4 of the conductor and in the mating surface of the gap 3 in the flange. The threads allow the conductor and the flange to be threaded together when the conductor is inserted into the gap. In order to facilitate ease of threading, a relatively large gap 3 is needed between the conductor and the flange 3. Also, the end 4 of the conductor is beveled 7 near the base to facilitate starting the threads, and a beveled slot 8 may be formed in the flange at the top of the gap on the outer side.

The conductor and the flange are cleaned using an acidic chemical substance such as Oakite-33 since the geometry of the threads makes mechanical cleaning processes ineffective. Flux is applied to the hollow conductor and the flange, and the end of the conductor is then inserted into the gap in the flange. The conductor and the flange are heated using either induction or furnace heating. Braze alloy is fed into the gap during heating. The braze alloy melts and flows within the gap so that, upon cooling, the flange and the conductor are bonded together.

However, several problems arise from using this method that prevent a complete bond from being formed. First, the threads in the connection create a tortuous path, so that any gas emanating from the heated flux is restricted from escaping. While some of the gas is forced up and out of the gap, much of it remains trapped in the gap. This makes it difficult for the braze alloy to flow into the bottom of the gap, as the flow of any gas is in the opposite direction from the flow of the braze material. Even if waterless flux is used, thereby reducing the volume of gas produced, the threads impede the flow of braze material to the bottom of the gap from the OD side of the flange. This is a major drawback as the seal between the conductor and the OD side is of critical importance since this is the primary flow path of current traveling through the conductor.

Further, application of braze material at the ID side of the flange is nearly impossible due to the long tubular shape of the conductor. Given the tortuous path through the thread and the difficulty of applying braze material to the ID side, it is virtually impossible that complete bonding can be accomplished along the bottom of the conductor. The bevel formed on the conductor OD to ease the starting of the threads aggravates this situation by creating a large void that should be filled with braze material.

The prior art method results in only about 15–20% of the surface of the flange and conductor being bonded. It is desirable to bond at least 75% of the surface to ensure structural integrity and electrical conductivity.

Accordingly, it is an object of this invention to provide a low cost, reliable process for constructing main lead bushings so as to form an improved seal between the flanges and the hollow conductor. This seal should be reliable and should provide a high degree of structural integrity and electrical conductivity between the flange and the hollow conductor.

SUMMARY OF THE INVENTION

In order to achieve these and other objects of the invention, a method of fabricating an electric generator main lead bushing is provided that is typically used for an air side flange having the steps of providing a hollow conductor having an end with a base and an inner portion, providing a flange, forming a gap having a bottom in the flange that is sized to receive the conductor end, forming a groove in the conductor end, placing a braze alloy insert into the groove, inserting the conductor end into the gap, heating the flange and the conductor so that the braze alloy melts and flows within the gap between the flange and the conductor, and cooling the flange and the conductor to solidify the braze alloy, thereby providing a seal between the flange and the conductor. In a preferred embodiment of the present invention, the groove is formed in the base or the inner portion of the conductor end. Alternatively or in combination, one or more grooves may be formed in the flange within the gap and braze alloy inserted into each groove formed.

Also, a method of fabricating an electric generator main lead bushing is provided that is typically used for a gas side flange having the steps of providing a hollow conductor having an end with an inner portion, providing a flange having a bottom edge, forming a counterbore having a lower surface in the inner portion that is sized to receive the flange, forming a groove in the counterbore, placing a braze alloy insert into the groove, fitting the flange into the counterbore, heating the flange and the conductor so that the braze alloy melts and flows within the counterbore between the flange and the conductor, and cooling the flange and the conductor to solidify the braze alloy, thereby providing a seal between the flange and the conductor. In a preferred embodiment of the present invention, the groove is formed in the lower surface of the counterbore. Alternatively or in combination, one or more grooves may be formed in the flange proximate the bottom edge and braze alloy inserted into each groove formed.

DETAILED DESCRIPTION OF THE INVENTION

Figure 1:
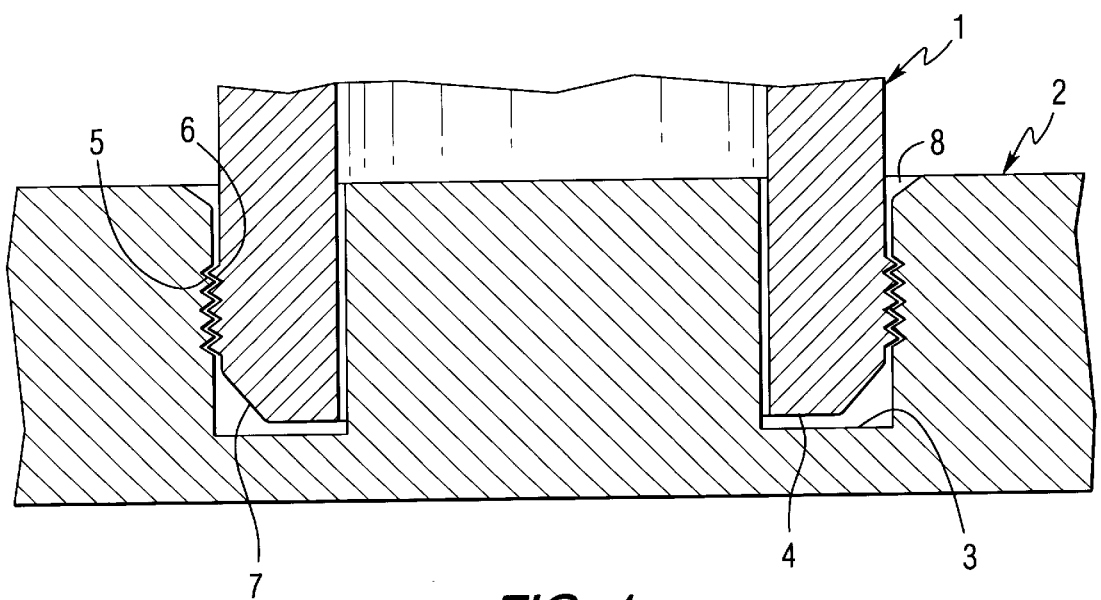
FIG. 1 is a cross-sectional view of a lead main bushing formed in accordance with the prior art where a hollow conductor is connected to an air side flange.
Figure 2:
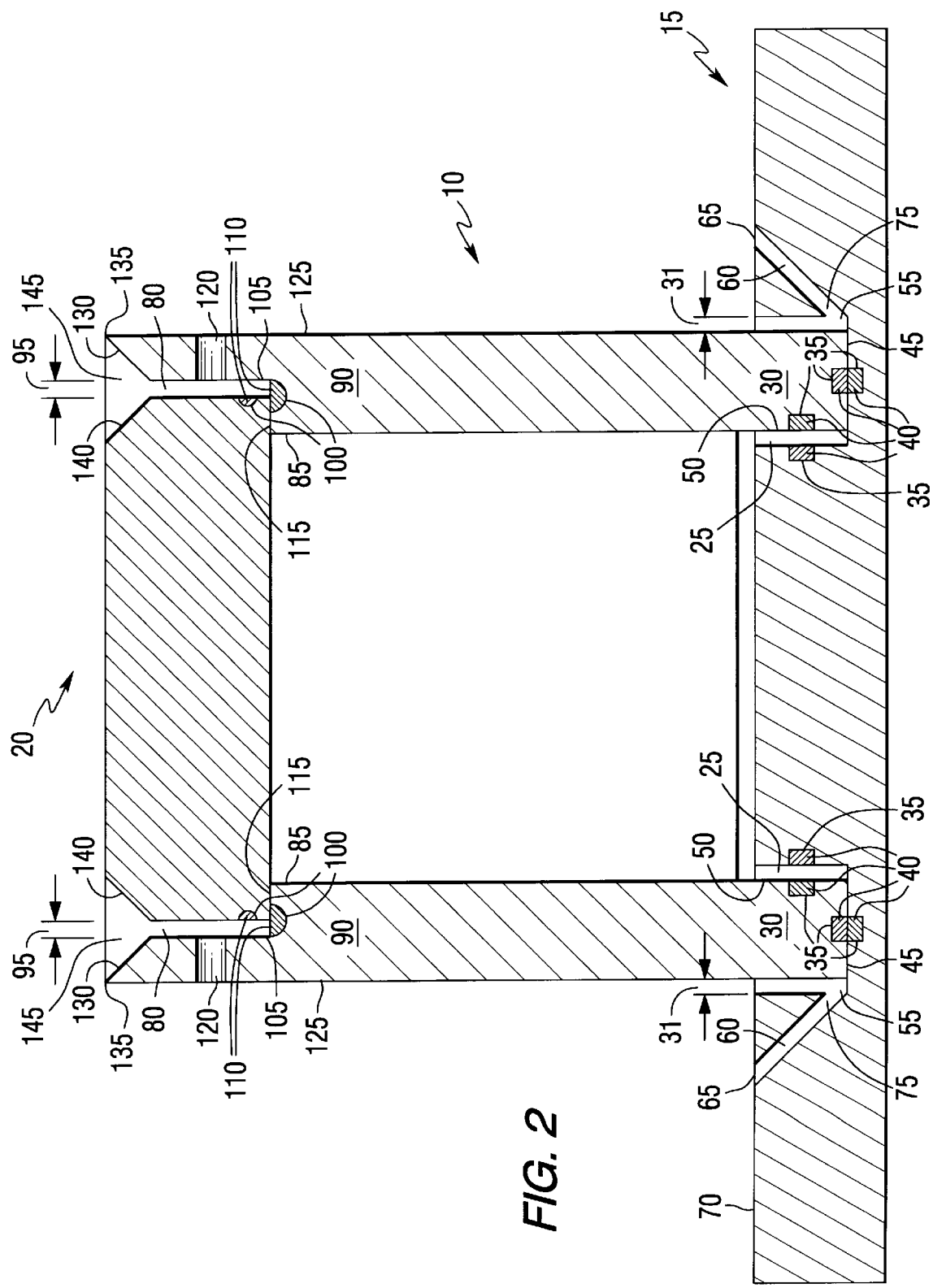
FIG. 2 is a cross-sectional view of a lead main bushing formed in accordance with the present invention where a hollow conductor is connected to an air side flange and a segment of a gas side flange.

FIG. 2 depicts a hollow conductor 10 attached to a pair of flanges 15, 20 formed by using the method disclosed in the present invention. The conductor 10 and the flanges 15, 20 are typically cylindrical and are composed of copper as is known in the art.

As illustrated in FIG. 2, in accordance with one application of the present invention, typically used for an air side flange 15, the hollow conductor 10 is attached to a flange 15 by inserting the conductor 10 into a gap 25 formed in the flange 15. The gap 25 is formed using standard machining processes known in the art, and is sized to receive the end 30 of the conductor 10 so that a predetermined distance 31 of approximately 2.5 mils or less is maintained between the conductor 10 and the flange 15 in order to facilitate capillary action or wicking between the conductor 10 and the flange 15.

One or more grooves 35 are formed in the end 30 of the conductor 10 using standard machining processes known in the art, and are sized to receive a braze alloy insert 40. In a preferred embodiment of the present invention, the grooves 35 are formed in the base 45 or the inner portion 50 of the end 30. Grooves 35 may also be formed in the flange 15 along a surface of the gap 25.

The conductor 10 and the flange 15 may be cleaned using standard mechanical techniques due to the lack of threads or complicated geometries. These techniques are relatively inexpensive compared to the chemical cleaning technique used in the prior art.

A braze alloy insert 40 preferably in the shape of a ring is then placed into each groove 35 formed. The flange 15 and the end 30 of the conductor 10 are then coated with flux and the end 30 is inserted into the gap 25. The flange 15 and the conductor 10 are then heated using induction or furnace heating. In induction heating, coils are used to sequentially heat successive areas of the gap 25. Typically, the bottom 55 of the gap 25 is heated first, and any grooves 35 in the upper portion of the gap 25 are heated last. The heat is applied until after wicking occurs. In furnace heating, the conductor 10 and the flange 15 are placed in a furnace and heated for a predetermined period of time so that the braze alloy 40 melts and flows within the gap 25 between the flange 15 and the conductor 10. The temperature of the furnace may typically be approximately 1,500 F. and the heating time may typically be 3–4 minutes. After the flange 15 and the conductor 10 are heated, they are allowed to cool in order to solidify the braze alloy 40. The cooled braze material provides a seal between the flange 15 and the conductor 10.

It is known to be beneficial to provide additional braze material to a joint through a hole formed in the workpiece. In one embodiment of the present invention, before the conductor 10 and the flange 15 are heated, a hole 60 may be formed in the flange 15 using standard machining processes known in the art. The hole 60 has a first end 65 opening at a surface 70 of the flange 15 and removed from the gap 25, and a second end 75 opening into the gap 25 proximate the bottom 55 of the gap 25. Wire braze alloy can then be inserted into the hole 60 during the heating of the conductor 10 and the flange 15. Because the braze alloy will travel a limited distance in the gap 25 along the circumference of the conductor 10, a plurality of holes 60 may be formed in the flange 15 at evenly-spaced intervals, for example at four 90 intervals, and alloy material may be inserted into each of these holes 60.

In accordance with another application of the present invention, typically used for a gas side flange 20 as illustrated in FIG. 2, the hollow conductor 10 is attached to a flange 20 by inserting the flange 20 into a counterbore 80 formed in the conductor 10. The counterbore 80 is formed in an inner portion 85 of the end 90 of the conductor 10 using standard machining processes. The counterbore 80 is sized to receive the flange 20 so that a predetermined distance 95 of 2.5 mils or less is maintained between the conductor 10 and the flange 20 in order to facilitate capillary action or wicking between the conductor 10 and the flange 20.

One or more grooves 100 are formed in the lower surface 105 of the counterbore 80 using standard machining processes. The grooves 100 are sized to receive a braze alloy insert 110. Grooves 100 may also be formed in the flange 20 proximate the bottom edge 115.

The conductor 10 and the flange 20 may be cleaned using standard mechanical techniques due to the lack of threads or complicated geometries. These techniques are relatively inexpensive compared to the chemical cleaning technique used in the prior art.

A braze alloy insert 110 preferably in the shape of a ring is then placed into each groove 100 formed. The flange 20 and the end 90 of the conductor 10 are then coated with flux and the flange 20 is fitted into the counterbore 80. The flange 20 and the conductor 10 are then heated using induction or furnace heating. In induction heating, coils are used to sequentially heat successive areas of the counterbore 80. Typically, the bottom of the counterbore 80 is heated first, and the upper portion of the counterbore 80 is heated last. The heat is applied until after wicking occurs. In furnace heating, the conductor 10 and the flange 20 are placed in a furnace and heated for a predetermined period of time so that the braze alloy 110 melts and flows within the counterbore 80 between the flange 20 and the conductor 10. The temperature of the furnace may typically be approximately 1,500 F. and the heating time may typically be 3–4 minutes. After the flange 20 and the conductor 10 are heated, they are allowed to cool in order to solidify the braze alloy 110. The cooled braze material provides a seal between the flange 20 and the conductor 10.

In one embodiment of the present invention, before the conductor 10 and the flange 20 are heated, a hole 120 may be drilled in the end 90 of the conductor 10 between the inner portion 85 and the outer portion 125. Wire braze alloy can then be inserted into the hole 120 during the heating of the conductor 10 and the flange 20. Because the braze alloy travels a limited distance in the counterbore 80 along the circumference of the conductor 10, a plurality of holes 120 may be formed in the end 90 at evenly-spaced intervals, for example at four 90 intervals, and alloy material may be inserted into each of these holes 120.

In another embodiment of the present invention, a beveled slot 130 may be formed in the base 135 of the end 90 of the conductor 10 and a corresponding beveled slot 140 may be formed in the flange 20 proximate the beveled slot 130 in the base 135 so as to form a V-shaped opening 145. These slots 130, 140 may be formed using standard machining processes known in the art. Wire braze alloy may then be applied to the V-shaped opening 145 during the heating of the conductor 10 and the flange 20. This provides an additional source of braze alloy, and helps to ensure that a complete seal is formed between the conductor 10 and the flange 20.

The present invention provides a seal in which 95–98% of the applicable surface area of the conductor and the flange is bonded. This is far superior to the 15–20% realized in the prior art, and exceeds the target 75% standard desired in most applications.

What is claimed is:

1. A method of fabricating an electric generator main lead bushing, the method comprising the steps of:

providing a hollow conductor having an end, said conductor end comprising a base and an inner portion;

providing a flange;

forming a gap having a bottom in said flange, said gap sized to receive said conductor end;

forming a groove in said conductor end;

placing a braze alloy insert into said groove;

inserting said conductor end into said gap;

heating said flange and said conductor so that the braze alloy melts and flows within said gap between said flange and said conductor; and cooling said flange and said conductor to solidify said braze alloy, thereby providing a seal between said flange and said conductor.

2. The method of claim 1 wherein said groove is formed in said base.

3. The method of claim 1 wherein said groove is formed in said inner portion.

4. The method of claim 1 further comprising the steps of forming a groove in said flange within said gap and placing a second braze alloy insert into said groove in said flange.

5. The method of claim 1 further comprising forming a plurality of grooves in said end, and placing a braze alloy insert within each of said grooves.

6. The method of claim 1 wherein said gap is formed so that a predetermined distance is maintained between said flange and said conductor end.

7. The method of claim 6 wherein said predetermined distance is 2.5 mils or less.

8. The method of claim 1 further comprising the steps of:

forming a hole in said flange, said hole having a first end opening at a surface of said flange and removed from said gap, and having a second end opening into said gap proximate said bottom; and inserting braze alloy into said hole during the step of heating.

9. A method of fabricating an electric generator main lead bushing, the method comprising the steps of:

providing a hollow conductor having an end;

providing a flange;

forming a gap in said flange, said gap sized to receive said conductor end;

forming a groove in said flange within said gap;

placing a braze alloy insert into said groove;

inserting said end into said gap;

heating said flange and said conductor so that the braze alloy melts and flows within said gap between said flange and said conductor; and cooling said flange and said conductor to solidify said braze alloy, thereby providing a seal between said flange and said conductor.

10. A method of fabricating an electric generator main lead bushing, the method comprising the steps of:

providing a hollow conductor having an end, said end comprising a base, an inner portion, and an outer portion;

providing a flange having a bottom edge;

forming a counterbore having a lower surface in said inner portion that is sized to receive said flange;

forming a groove in said counterbore;

placing a braze alloy insert into said groove;

fitting said flange into said counterbore;

heating said flange and said conductor so that the braze alloy melts and flows within said counterbore between said flange and said conductor; and cooling said flange and said conductor to solidify said braze alloy, thereby providing a seal between said flange and said conductor.

11. The method of claim 10 wherein said groove is formed in said lower surface.

12. The method of claim 10 further comprising the steps of forming a groove in said flange proximate said bottom edge and placing a second braze alloy insert into said groove in said flange.

13. The method of claim 10 further comprising forming a plurality of grooves in said counterbore, and placing a braze alloy insert within each of said grooves.

14. The method of claim 10 wherein said counterbore is formed so that a predetermined distance is maintained between said flange and said conductor end.

15. The method of claim 14 wherein said predetermined distance is 2.5 mils or less.

16. The method of claim 10 further comprising the steps of:

forming a hole in said end between said inner portion and said outer portion; and inserting braze alloy into said hole during the step of heating.

17. The method of claim 10 comprising the additional steps of:

forming a beveled slot in said base;

forming a beveled slot in said flange proximate the beveled slot in said base so as to form a V-shaped opening; and inserting braze alloy into said opening during the step of heating.

18. A method of fabricating an electric generator main lead bushing, the method comprising the steps of:

providing a hollow conductor having an end, said end comprising a base, an inner portion, and an outer portion;

providing a flange having a bottom edge;

forming a counterbore having a lower surface in said inner portion that is sized to receive said flange;

forming a groove in said flange proximate said bottom edge;

placing a braze alloy insert into said groove;

fitting said flange into said counterbore;

heating said flange and said conductor so that the braze alloy melts and flows within said counterbore between said flange and said conductor; and cooling said flange and said conductor to solidify said braze alloy, thereby providing a seal between said flange and said conductor.

19. The method of claim 18 further comprising the steps of forming a groove in said lower surface and placing a second braze alloy insert into said groove.

20. The method of claim 18 further comprising forming a plurality of grooves in said flange, and placing a braze alloy insert within each of said grooves.

21. The method of claim 18 further comprising the steps of:

forming a hole in said end between said inner portion and said outer portion; and inserting braze alloy into said hole during the step of heating.

22. The method of claim 18 comprising the additional steps of:

forming a beveled slot in said base;

forming a beveled slot in said flange proximate the beveled slot in said base so as to form a V-shaped opening; and inserting braze alloy into said opening during the step of heating.

* * * * *